(12) United States Patent
Burns et al.

(10) Patent No.: US 11,138,275 B1
(45) Date of Patent: Oct. 5, 2021

(54) SYSTEMS AND METHODS FOR FILTER CONVERSION

(71) Applicant: Ionic Security Inc., Atlanta, GA (US)

(72) Inventors: Jonathan Thomas Burns, Annapolis, MD (US); Ryan Speers, Silver Spring, MD (US)

(73) Assignee: Ionic Security Inc., Atlanta, GA (US)

( * ) Notice: Subject to any disclaimer, the term of this patent is extended or adjusted under 35 U.S.C. 154(b) by 128 days.

(21) Appl. No.: 15/973,027

(22) Filed: May 7, 2018

Related U.S. Application Data

(60) Provisional application No. 62/502,731, filed on May 7, 2017.

(51) Int. Cl.
  *G06F 17/00* (2019.01)
  *G06F 16/9535* (2019.01)
  *G06F 16/22* (2019.01)

(52) U.S. Cl.
  CPC ...... *G06F 16/9535* (2019.01); *G06F 16/2255* (2019.01)

(58) Field of Classification Search
  CPC .......................... G06F 16/9535; G06F 16/2255
  See application file for complete search history.

(56) References Cited

U.S. PATENT DOCUMENTS

| | | | |
|---|---|---|---|
| 7,269,664 B2* | 9/2007 | Hutsch | H04L 67/2823 709/246 |
| 7,707,202 B2* | 4/2010 | Heyraud | G06Q 10/02 707/706 |
| 10,051,001 B1* | 8/2018 | Ashley | H04L 63/10 |
| 2001/0039540 A1* | 11/2001 | Hofmann | H04L 61/35 |
| 2011/0270852 A1* | 11/2011 | Watanabe | G06F 16/2255 707/754 |
| 2013/0031229 A1* | 1/2013 | Shiga | G06F 16/2255 709/223 |
| 2015/0154219 A1* | 6/2015 | Kruglick | G06F 16/1748 707/692 |
| 2017/0154099 A1* | 6/2017 | Chen | G06F 16/325 |

\* cited by examiner

*Primary Examiner* — Tyler J Torgrimson
(74) *Attorney, Agent, or Firm* — Morris, Manning & Martin, LLP; Daniel J. Sineway, Esq.; Adam J. Thompson, Esq.

(57) ABSTRACT

Systems and methods are disclosed for, without access to the original set of data elements from which the online filter was originally constructed, converting online filters to other types of filters. To convert a particular type of online filter to either an offline filter or a different type of online filter, the system, in various embodiments, first determines the types/formats of each of the relevant filters. Then, in various embodiments, the system extracts the appropriate data representations from the original online filter. In various embodiments, the system converts the extracted data representations into the data representation format of the new filter. The system, in various embodiments, then constructs the new filter from the converted data representations.

34 Claims, 4 Drawing Sheets

EXEMPLARY FILTER CONVERSION PROCESS

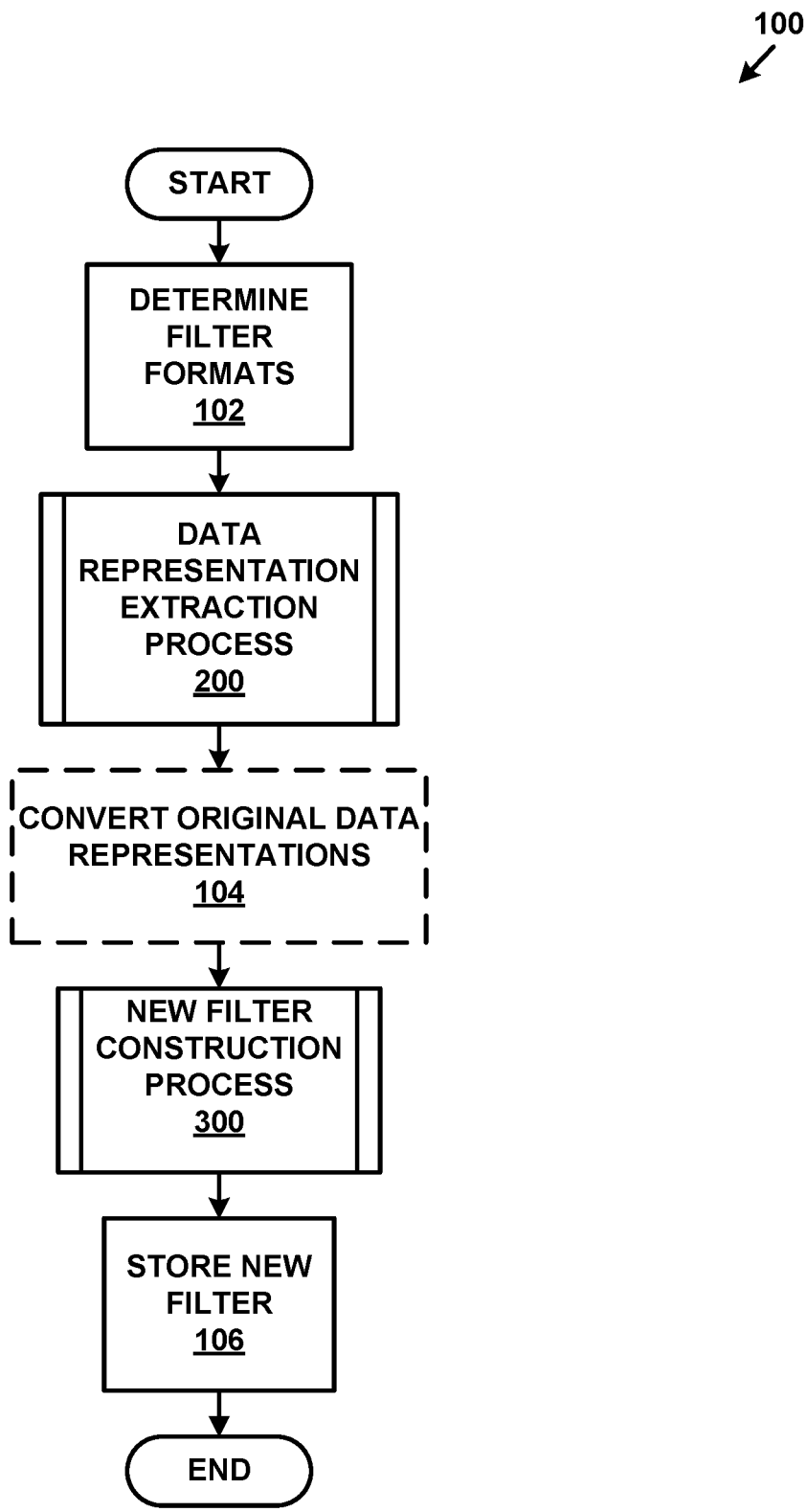
FIG 1: EXEMPLARY FILTER CONVERSION PROCESS

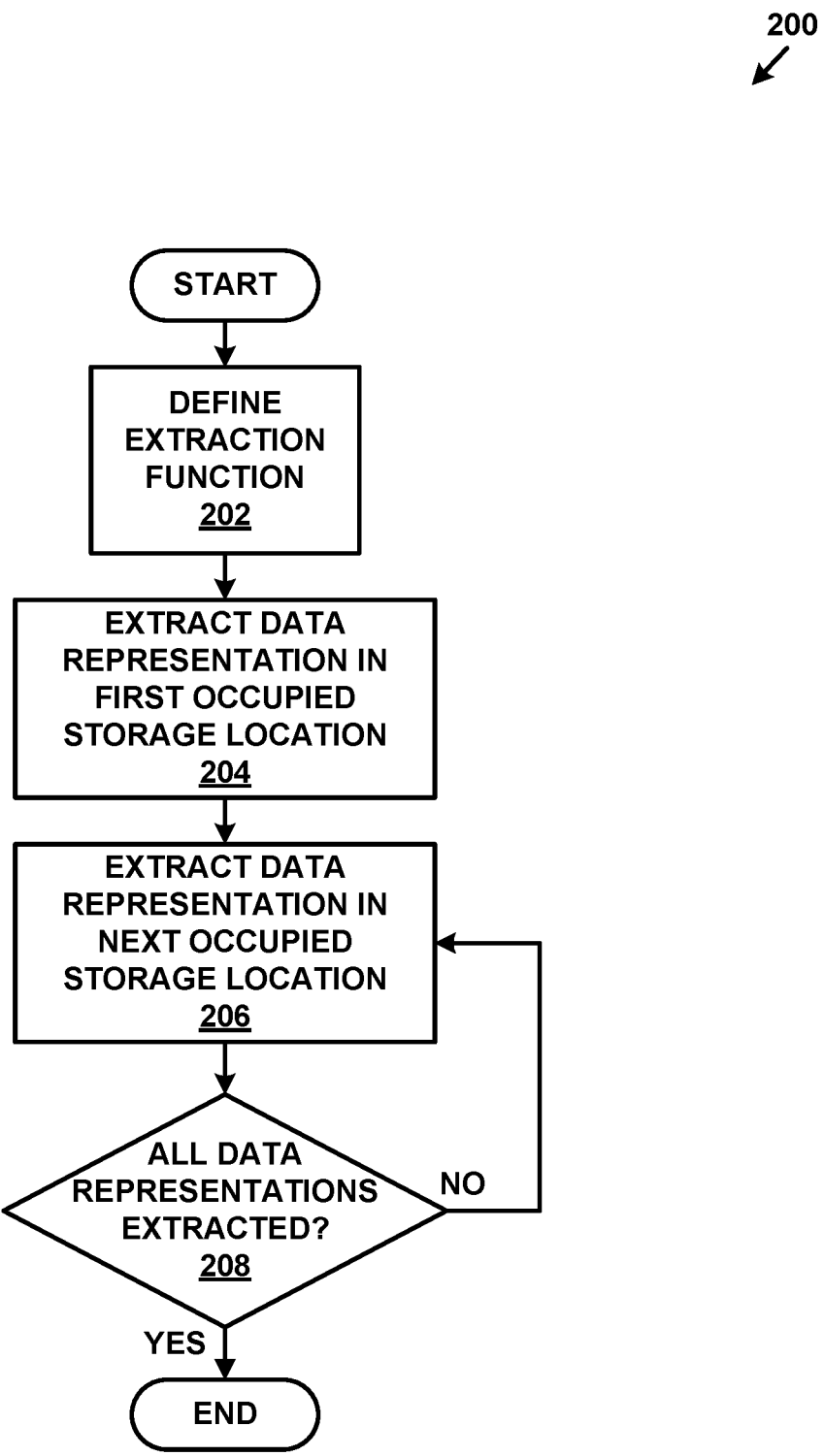
FIG 2: EXEMPLARY DATA REPRESENTATION EXTRACTION PROCESS

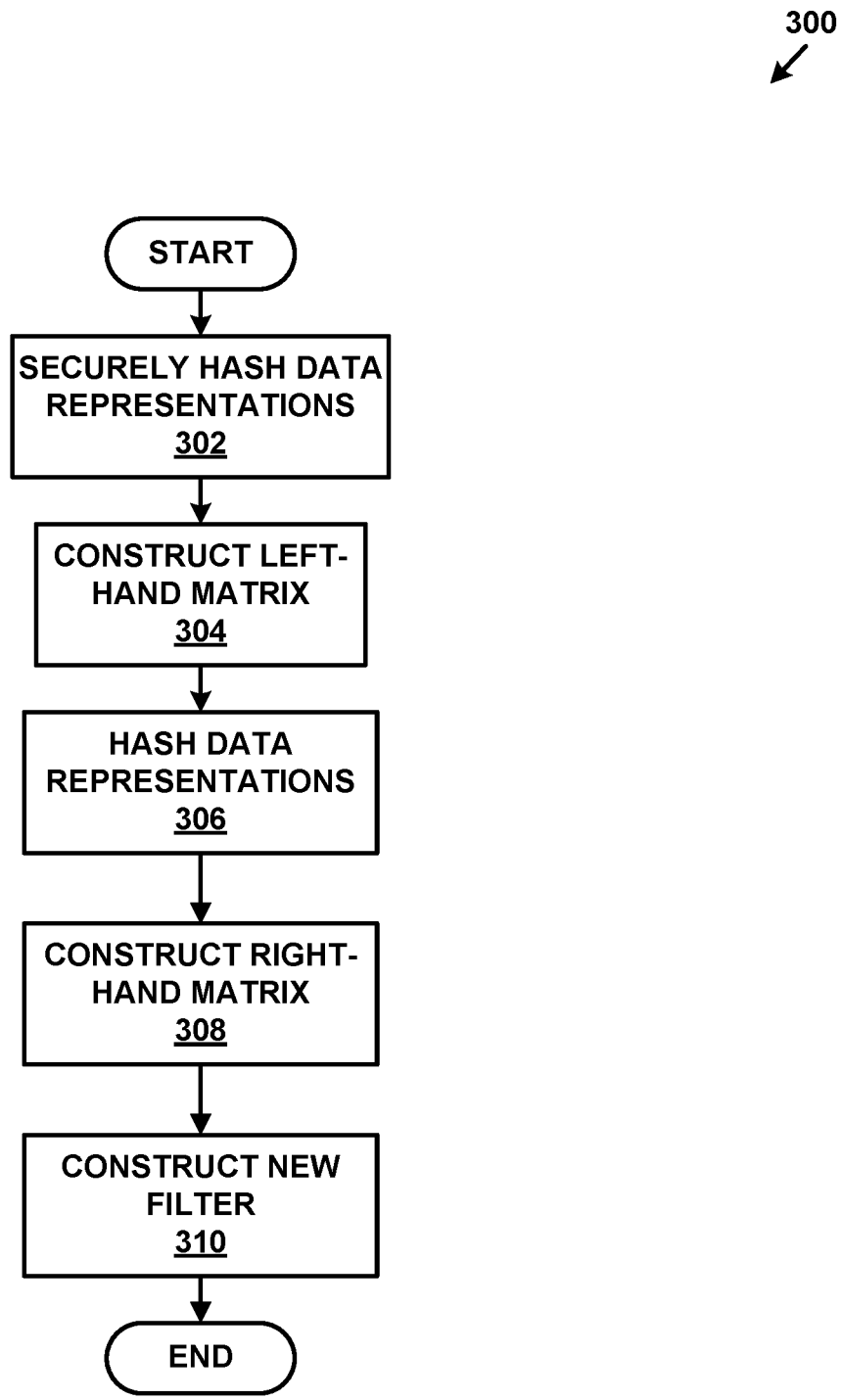
*FIG 3:* EXEMPLARY NEW FILTER CONSTRUCTION PROCESS

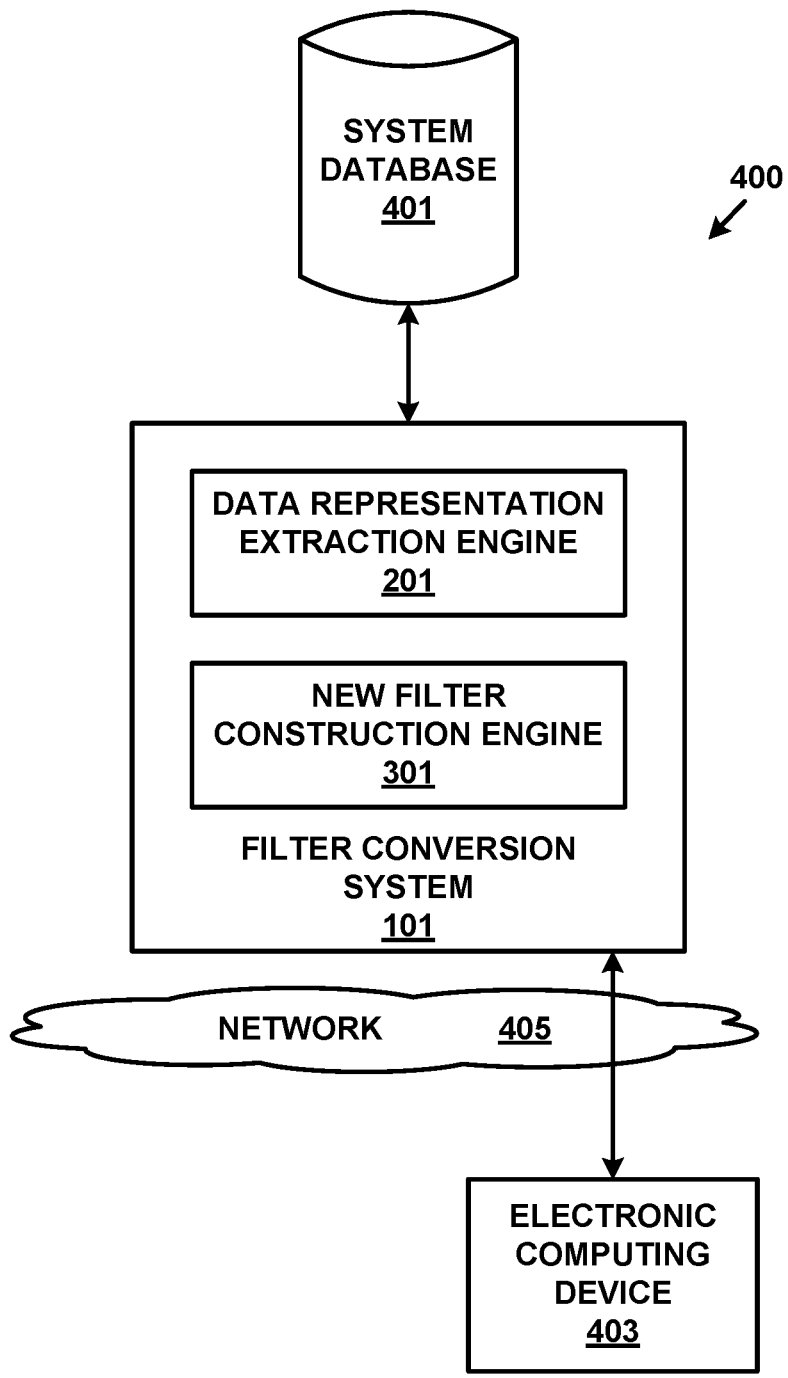
FIG 4: EXEMPLARY SYSTEM ARCHITECTURE

US 11,138,275 B1

SYSTEMS AND METHODS FOR FILTER CONVERSION

CROSS REFERENCE TO RELATED APPLICATIONS

This application claims priority to, the benefit under 35 U.S.C. § 119 of, and incorporates by reference herein in its entirety U.S. Provisional Patent Application No. 62/502,731, filed May 7, 2017, and entitled "Systems and Methods for Filter Conversion."

TECHNICAL FIELD

The present systems and methods relate generally to data structure conversion and, more particularly, to conversion of online filters to other types of filters.

BACKGROUND

Set membership filters (e.g., Bloom filters, XORSAT filters, Cuckoo filters, etc.) generally comprise data structures that are deployed in various scenarios to permit space-efficient and time-efficient querying of whether a particular data element is within a larger set of data elements. For example, a set membership filter may be constructed to represent all of the unique terms in an enterprise data repository so that an employee can use keyword searching to find documents in the enterprise data repository. In this manner for example, a single set membership filter, with a size on the order of a few megabytes or gigabytes and an error rate of less than 5%, may permit querying of an entire data repository with a size on the order of several petabytes or even larger.

Increased functionality of set membership filters, however, often comes at the expense of space efficiency and security. For example, set membership filters that permit insertion, deletion, and other functionality (also referred to as "online" or "dynamic" filters) generally require more storage space than set membership filters that do not permit any functionality beyond querying (also referred to as "offline" or "static" filters). Similarly, online filters generally are less secure than offline filters as the data represented within online filters is easier to extract than from offline filters.

Once a particular filter type has been selected and a set membership filter constructed, traditionally, it has been practically impossible to convert the constructed set membership filter to a different filter type. Thus, if a different filter type with different functionalities, space-efficiency, or other properties is desired, then the new filter must be created from the original set of data elements, which risks the security of the original set of data elements and/or presents practical challenges from accessing such large amounts of data (e.g., time, computing power, etc.).

Therefore, there is a long-felt but unresolved need for a system or method that enables conversion of online filters to other types of filters, without full access to the original set of data elements from which the online filter was originally constructed.

BRIEF SUMMARY OF THE DISCLOSURE

Briefly described, and according to one embodiment, aspects of the present disclosure generally relate to systems and methods for conversion of online filters to other types of filters, without full access to the original set of data elements from which the online filter was originally constructed.

Generally, "filters" (also referred to as "set membership filters" and/or "approximate set membership filters") are probabilistic algorithms, data structures, or other mathematical objects that can be used to quickly decide whether a given element is within a given set (e.g., filters solve the set membership problem by efficiently testing whether a large set of data contains a particular item). Thus, filters are created to efficiently represent a large set of data so that a subsequent user can determine, with an acceptable error rate (of false positives, false negatives, and other types of collisions), whether an item is within the original set of data through access to just the filter (further details regarding set membership filters are discussed in Sean A. Weaver et al., *Satisfiability-based Set Membership Filters*, in 8 Journal on Satisfiability, Boolean Modeling and Computation 129 (2014), the disclosure of which is incorporated by reference herein; further exemplary uses of set membership filters are described in U.S. patent application Ser. No. 15/392,561, entitled, "Systems and Methods for Cryptographically-Secure Queries Using Filters Generated by Multiple Parties," and filed on Dec. 28, 2016, the disclosure of which is incorporated by reference herein).

To accomplish this space-efficient and time-efficient querying, set membership filters generally comprise representations of each of the data elements within the set of data elements the particular filter was constructed to represent. Thus, because the filters do not contain the actual data elements but, instead, only comprise representations of the data elements, it has traditionally been virtually impossible to convert a filter of a particular type to a different type of filter without access to the original set of data elements from which the original filter was originally constructed. Accordingly, the present disclosure represents an improvement in filters, data storage, and data structures, because if a new filter type is needed (e.g., a data repository is being converted to a more space efficient data archive, the security of a particular data repository needs to be increased, the system for which the original filter was created is being converted to a new system that is not compatible with the original filter, etc.), then the presently disclosed systems and methods, in various embodiments, may convert online filters to other (or the same) online filters, online filters to offline filters, offline filters to online filters, and offline filters to other offline filters, without full access to the original set of data elements from which the filter was originally constructed.

Online filters generally comprise set membership filters that generally permit additional dynamic functionality such as inserting data elements after initial creation of the filter, deleting data elements after initial creation of the filter, counting of the data elements stored within the filter, etc. Examples of online filters include Bloom filters, compressed Bloom filters, blocked Bloom filters, counting Bloom filters, spectral Bloom filters, buffered quotient filters, cascade filters, Cuckoo filters, approximate concurrent state machines, rank-index hashing, key-value Bloom filters, stable Bloom filters, counting quotient filters, etc. Online filters may, for example, be deployed by search engines to store each of the URLs that have been previously crawled by that search engine so that the search engine does not store duplicate URLs. Online filters may also be deployed to monitor network traffic through identification of distinct IP addresses to determine who is using a particular network and what websites those users are accessing over the network. Further, online filters may be deployed to detect duplicate clicks of online advertisements based on user IDs to determine the appropriate amounts that an advertiser should pay, in a pay-per-unique-click scenario, for advertisements on a particular website. There are many other uses for online filters (e.g., permitting secure-querying of encrypted enterprise data repositories by providing security through the non-invertability and oblivious access properties of the filters, etc.), and this disclosure does not place any limitations on the purposes for which online filters may be used.

Online filters are generally constructed in such a way that each data element's representation within the filter is segregated from the representations of the other data elements represented within the filter. For example, Cuckoo filters are constructed by placing a "fingerprint" of a particular data item (e.g., a representation of the data item) in a single bucket or storage location within the filter. Two or more fingerprints are generally not stored within the same bucket or storage location within the filter; thus, the representation of a particular data element within a Cuckoo filter is segregated from the representations of the other data elements represented within that filter. Further details regarding Cuckoo filters are discussed in Bin Fan et al., *Cuckoo Filter: Practically Better Than Bloom*, in CoNEXT' 14 (2014), the disclosure of which is incorporated by reference herein.

Offline filters, in contrast, generally comprise set membership filters that generally do not permit additional dynamic functionality (e.g., inserting or deleting data elements after initial creation of the filter, etc.) and instead only permit querying to determine whether a data element is represented with the filter as originally constructed. Examples of offline filters include matrix-solving based dictionaries, succinct dictionaries, word-size truncated recursion filters, SAT filters, XORSAT filters, Bloomier filters, etc. Offline filters may be deployed in situations that require high space efficiency, higher security, etc. or in situations that do not require the dynamic functionalities of online filters. For example, an offline filter may be used to represent the data within an enterprise's archive (e.g., data that will not be frequently accessed, changed, or updated).

Offline filters are generally constructed in such a way that each data element's representation within the filter is comingled with the representations of the other data elements represented within the filter. Generally, this comingling results in an inability to determine the individual representation of a particular data element, which makes the filter both more secure (because a potential malicious actor with access to the filter cannot determine the individual data representations within the filter without access to additional information) and more space efficient. For example, XORSAT filters are constructed by solving the linear system AX=B, wherein A is a matrix with rows based on a secure hash of the data elements that the filter will represent, X is the filter, and B is a matrix with rows based on another hash of the data elements that the filter will represent and the acceptable error rate for the filter. Further details regarding XORSAT filters are discussed in Weaver, *Satisfiability-based Set Membership Filters* (previously referenced herein).

To convert a particular type of online filter to either an offline filter or a different type of online filter, the system, in various embodiments, first determines the types/formats of each of the relevant filters. Then, in various embodiments, the system extracts the appropriate data representations from the original online filter. Generally, how (and in what format) the system extracts the appropriate data representation will depend on the format of both the original filter and the new filter. In various embodiments, the system converts the extracted data representations into the data representation format of the new filter. The system, in various embodiments, then constructs the new filter from the converted data representations.

In one embodiment, a method for converting an original online filter to a new online or offline filter, comprising the steps of: determining the type of the original online filter, wherein the original online filter comprises first filter data corresponding to original data; determining the type of the new online or offline filter; extracting representations of the original data from the original online filter based on the determined type of the original online filter; converting the representations of the original data into second filter data corresponding to the original data, wherein the second filter data is in a format compatible with the determined type of the new online or offline filter; and constructing the new online or offline filter based on the second filter data.

In one embodiment, a system for converting an original online filter to a new online or offline filter, comprising a processor operative to: determine the type of the original online filter, wherein the original online filter comprises first filter data corresponding to original data; determine the type of the new online or offline filter; extract representations of the original data from the original online filter based on the determined type of the original online filter; convert the representations of the original data into second filter data corresponding to the original data, wherein the second filter data is in a format compatible with the determined type of the new online or offline filter; and construct the new online or offline filter based on the second filter data.

According to one aspect of the present disclosure, the method, wherein the type of the original online filter is selected from the list comprising: Bloom filters, compressed Bloom filters, blocked Bloom filters, counting Bloom filters, spectral Bloom filters, buffered quotient filters, cascade filters, Cuckoo filters, approximate concurrent state machines, rank-index hashing, key-value Bloom filters, stable Bloom filters, and counting quotient filters. Furthermore, the method, wherein the type of the new online or offline filter is selected from the list comprising: Bloom filters, compressed Bloom filters, blocked Bloom filters, counting Bloom filters, spectral Bloom filters, buffered quotient filters, cascade filters, Cuckoo filters, approximate concurrent state machines, rank-index hashing, key-value Bloom filters, stable Bloom filters, and counting quotient filters. Moreover, the method, wherein the type of the new online or offline filter is selected from the list comprising: matrix-solving based dictionaries, succinct dictionaries, word-size truncated recursion filters, SAT filters, XORSAT filters, and Bloomier filters. Further, the method, wherein the step of extracting representations of the original data from the original online filter further comprises the steps of: defining an extraction function; determining a first occupied storage location in the original online filter; extracting a first representation of the original data from the first occupied storage location based on the extraction function; determining a next occupied storage location in the original online filter; and extracting a next representation of the original data from the next occupied storage location based on the extraction function. Additionally, the method, wherein the step of extracting representations of the original data from the original online filter further comprises the step of determining that there is no next occupied storage location in the original online filter. Also, the method, wherein the step of extracting representations of the original data from the original online filter further comprises the step of comparing the representations of the original data to a portion of the original data.

According to one aspect of the present disclosure, the method, wherein the step of extracting representations of the original data from the original online filter occurs without access to the original data. Furthermore, the method, wherein the step of converting the representations of the original data into second filter data corresponding to the original data further comprises the steps of: hashing the representations of the original data with a first secure hash function to generate secure filter data; constructing a left-hand matrix based on the secure filter data; hashing the representations of the original data with a first secure hash function to generate error-rate limited filter data; and constructing a right-hand matrix based on the error-rate limited filter data. Moreover, the method, wherein the step of constructing the new online or offline filter further comprises the step of generating the new online or offline filter based on the left-hand matrix and the right-hand matrix. Further, the method, wherein the determined type of the original online filter comprises a Cuckoo filter. Additionally, the method, wherein the determined type of the new online or offline filter comprises a XORSAT filter. Also, the method, wherein the extraction function comprises a symmetric function satisfying $F(x,y)=F(y,x)$ for all x,y.

According to one aspect of the present disclosure, the method, wherein the left-hand matrix comprises:

$$\begin{pmatrix} L(f(t_{11}),1) \\ L(f(t_{12}),1) \\ \vdots \\ L(f(t_{1n}),1) \\ L(f(t_{21}),2) \\ \vdots \\ L(f(t_{mn},m)) \end{pmatrix}.$$

Furthermore, the method, wherein the right-hand matrix comprises:

$$\begin{pmatrix} R(f(t_{11}),1) \\ R(f(t_{12}),1) \\ \vdots \\ R(f(t_{1n}),1) \\ R(f(t_{21}),2) \\ \vdots \\ R(f(t_{mn},m)) \end{pmatrix}.$$

Moreover, the method, wherein the new online or offline filter comprises:

$$\begin{pmatrix} x_1 \\ x_2 \\ \vdots \\ x_n \\ x_{n+1} \\ \vdots \\ x_{nm} \end{pmatrix}$$

such that $$\begin{pmatrix} L(f(t_{11}),1) \\ L(f(t_{12}),1) \\ \vdots \\ L(f(t_{1n}),1) \\ L(f(t_{21}),2) \\ \vdots \\ L(f(t_{mn},m)) \end{pmatrix} \begin{pmatrix} x_1 \\ x_2 \\ \vdots \\ x_n \\ x_{n+1} \\ \vdots \\ x_{nm} \end{pmatrix} = \begin{pmatrix} R(f(t_{11}),1) \\ R(f(t_{12}),1) \\ \vdots \\ R(f(t_{1n}),1) \\ R(f(t_{21}),2) \\ \vdots \\ R(f(t_{mn},m)) \end{pmatrix}.$$

Further, the method, wherein the original online filter comprises a first original online filter, further comprising the steps of: prior to determining the type of the new online or offline filter, determining the type of a second original online filter, wherein the second original online filter comprises third filter data corresponding to additional original data; and prior to converting the representations of the original data into second filter data corresponding to the original data, extracting representations of the additional original data from the second original online filter based on the determined type of the second original online filter, wherein the step of converting the representations of the original data into second filter data corresponding to the original data, further comprises converting the representations of the additional original data into the second filter data.

According to one aspect of the present disclosure, the system, wherein the type of the original online filter is selected from the list comprising: Bloom filters, compressed Bloom filters, blocked Bloom filters, counting Bloom filters, spectral Bloom filters, buffered quotient filters, cascade filters, Cuckoo filters, approximate concurrent state machines, rank-index hashing, key-value Bloom filters, stable Bloom filters, and counting quotient filters. Additionally, the system, wherein the type of the new online or offline filter is selected from the list comprising: Bloom filters, compressed Bloom filters, blocked Bloom filters, counting Bloom filters, spectral Bloom filters, buffered quotient filters, cascade filters, Cuckoo filters, approximate concurrent state machines, rank-index hashing, key-value Bloom filters, stable Bloom filters, and counting quotient filters. Also, the system, wherein the type of the new online or offline filter is selected from the list comprising: matrix-solving based dictionaries, succinct dictionaries, word-size truncated recursion filters, SAT filters, XORSAT filters, and Bloomier filters. Furthermore, the system, wherein the processor, to extract representations of the original data from the original online filter, is further operative to: define an extraction function; determine a first occupied storage location in the original online filter; extract a first representation of the original data from the first occupied storage location based on the extraction function; determine a next occupied storage location in the original online filter; and extract a next representation of the original data from the next occupied storage location based on the extraction function. Moreover, the system, wherein the processor, to extract representations of the original data from the original online filter, is further operative to determine that there is no next occupied storage location in the original online filter. Further, the system, wherein the processor, to extract representations of the original data from the original online filter, is further operative to compare the representations of the original data to a portion of the original data.

According to one aspect of the present disclosure, the system, wherein the processor, to extract representations of the original data from the original online filter, does not have access to the original data. Additionally, the system, wherein the processor, to convert the representations of the original data into second filter data corresponding to the original data, is further operative to: hash the representations of the original data with a first secure hash function to generate secure filter data; construct a left-hand matrix based on the secure filter data; hash the representations of the original data with a first secure hash function to generate error-rate limited filter data; and construct a right-hand matrix based on the error-rate limited filter data. Also, the system, wherein the processor, to construct the new online or offline filter, is further operative to generate the new online or offline filter based on the left-hand matrix and the right-hand matrix. Furthermore, the system, wherein the determined type of the original online filter comprises a Cuckoo filter. Moreover, the system, wherein the determined type of the new online or offline filter comprises a XORSAT filter. Further, the system, wherein the extraction function comprises a symmetric function satisfying $F(x,y)=F(y,x)$ for all x,y.

According to one aspect of the present disclosure, the system, wherein the left-hand matrix comprises:

$$\begin{pmatrix} L(f(t_{11}), 1) \\ L(f(t_{12}), 1) \\ \vdots \\ L(f(t_{1n}), 1) \\ L(f(t_{21}), 2) \\ \vdots \\ L(f(t_{mn}, m)) \end{pmatrix}.$$

Additionally, the system, wherein the right-hand matrix comprises:

$$\begin{pmatrix} R(f(t_{11}), 1) \\ R(f(t_{12}), 1) \\ \vdots \\ R(f(t_{1n}), 1) \\ R(f(t_{21}), 2) \\ \vdots \\ R(f(t_{mn}, m)) \end{pmatrix}.$$

Also, the system, wherein the new online or offline filter comprises:

$$\begin{pmatrix} x_1 \\ x_2 \\ \vdots \\ x_n \\ x_{n+1} \\ \vdots \\ x_{nm} \end{pmatrix}$$

such that $$\begin{pmatrix} L(f(t_{11}), 1) \\ L(f(t_{12}), 1) \\ \vdots \\ L(f(t_{1n}), 1) \\ L(f(t_{21}), 2) \\ \vdots \\ L(f(t_{mn}, m)) \end{pmatrix} \begin{pmatrix} x_1 \\ x_2 \\ \vdots \\ x_n \\ x_{n+1} \\ \vdots \\ x_{nm} \end{pmatrix} = \begin{pmatrix} R(f(t_{11}), 1) \\ R(f(t_{12}), 1) \\ \vdots \\ R(f(t_{1n}), 1) \\ R(f(t_{21}), 2) \\ \vdots \\ R(f(t_{mn}, m)) \end{pmatrix}.$$

Furthermore, the system, wherein the original online filter comprises a first original online filter and wherein the processor is further operative to: prior to determining the type of the new online or offline filter, determine the type of a second original online filter, wherein the second original online filter comprises third filter data corresponding to additional original data; and prior to converting the representations of the original data into second filter data corresponding to the original data, extract representations of the additional original data from the second original online filter based on the determined type of the second original online filter, wherein the processor, to convert the representations of the original data into second filter data corresponding to the original data, is further operative to convert the representations of the additional original data into the second filter data.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 is a flowchart showing an exemplary filter conversion process, according to one embodiment of the present disclosure.

FIG. 2 is a flowchart showing an exemplary data representation extraction process, according to one embodiment of the present disclosure.

FIG. 3 is a flowchart showing an exemplary new filter construction process, according to one embodiment of the present disclosure.

FIG. 4 illustrates an exemplary architecture of one embodiment of the disclosed system.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to conversion of online filters to other types of filters, without full access to the original set of data elements from which the online filter was originally constructed.

Generally, "filters" (also referred to as "set membership filters" and/or "approximate set membership filters") are probabilistic algorithms, data structures, or other mathematical objects that can be used to quickly decide whether a given element is within a given set (e.g., filters solve the set membership problem by efficiently testing whether a large set of data contains a particular item). Thus, filters are created to efficiently represent a large set of data so that a subsequent user can determine, with an acceptable error rate (of false positives, false negatives, and other types of collisions), whether an item is within the original set of data through access to just the filter (further details regarding set membership filters are discussed in Sean A. Weaver et al., *Satisfiability-based Set Membership Filters*, in 8 Journal on Satisfiability, Boolean Modeling and Computation 129 (2014), the disclosure of which is incorporated by reference herein; further exemplary uses of set membership filters are described in U.S. patent application Ser. No. 15/392,561, entitled, "Systems and Methods for Cryptographically-Secure Queries Using Filters Generated by Multiple Parties," and filed on Dec. 28, 2016, the disclosure of which is incorporated by reference herein).

To accomplish this space-efficient and time-efficient querying, set membership filters generally comprise representations of each of the data elements within the set of data elements the particular filter was constructed to represent. Thus, because the filters do not contain the actual data elements but, instead, only comprise representations of the data elements, it has traditionally been virtually impossible to convert a filter of a particular type to a different type of filter without access to the original set of data elements from which the original filter was originally constructed. Accordingly, the present disclosure represents an improvement in filters, data storage, and data structures, because if a new filter type is needed (e.g., a data repository is being converted to a more space efficient data archive, the security of a particular data repository needs to be increased, the system for which the original filter was created is being converted to a new system that is not compatible with the original filter, etc.), then the presently disclosed systems and methods, in various embodiments, may convert online filters to other (or the same) online filters, online filters to offline filters, offline filters to online filters, and offline filters to other offline filters, without full access to the original set of data elements from which the filter was originally constructed.

Online filters generally comprise set membership filters that generally permit additional dynamic functionality such as inserting data elements after initial creation of the filter, deleting data elements after initial creation of the filter, counting of the data elements stored within the filter, etc. Examples of online filters include Bloom filters, compressed Bloom filters, blocked Bloom filters, counting Bloom filters, spectral Bloom filters, buffered quotient filters, cascade filters, Cuckoo filters, approximate concurrent state machines, rank-index hashing, key-value Bloom filters, stable Bloom filters, counting quotient filters, etc. Online filters may, for example, be deployed by search engines to store each of the URLs that have been previously crawled by that search engine so that the search engine does not store duplicate URLs. Online filters may also be deployed to monitor network traffic through identification of distinct IP addresses to determine who is using a particular network and what websites those users are accessing over the network. Further, online filters may be deployed to detect duplicate clicks of online advertisements based on user IDs to determine the appropriate amounts that an advertiser should pay, in a pay-per-unique-click scenario, for advertisements on a particular website. There are many other uses for online filters (e.g., permitting secure-querying of encrypted enterprise data repositories by providing security through the non-invertability and oblivious access properties of the filters, etc.), and this disclosure does not place any limitations on the purposes for which online filters may be used.

Online filters are generally constructed in such a way that each data element's representation within the filter is segregated from the representations of the other data elements represented within the filter. For example, Cuckoo filters are constructed by placing a "fingerprint" of a particular data item (e.g., a representation of the data item) in a single bucket or storage location within the filter. Two or more fingerprints are generally not stored within the same bucket or storage location within the filter; thus, the representation of a particular data element within a Cuckoo filter is segregated from the representations of the other data elements represented within that filter. Further details regarding Cuckoo filters are discussed in Bin Fan et al., *Cuckoo Filter: Practically Better Than Bloom*, in CoNEXT' 14 (2014), the disclosure of which is incorporated by reference herein.

Offline filters, in contrast, generally comprise set membership filters that generally do not permit additional dynamic functionality (e.g., inserting or deleting data elements after initial creation of the filter, etc.) and instead only permit querying to determine whether a data element is represented with the filter as originally constructed. Examples of offline filters include matrix-solving based dictionaries, succinct dictionaries, word-size truncated recursion filters, SAT filters, XORSAT filters, Bloomier filters, etc. Offline filters may be deployed in situations that require high space efficiency, higher security, etc. or in situations that do not require the dynamic functionalities of online filters. For example, an offline filter may be used to represent the data within an enterprise's archive (e.g., data that will not be frequently accessed, changed, or updated).

Offline filters are generally constructed in such a way that each data element's representation within the filter is comingled with the representations of the other data elements represented within the filter. Generally, this comingling results in an inability to determine the individual representation of a particular data element, which makes the filter both more secure (because a potential malicious actor with access to the filter cannot determine the individual data representations within the filter without access to additional information) and more space efficient. For example, XORSAT filters are constructed by solving the linear system AX=B, wherein A is a matrix with rows based on a secure hash of the data elements that the filter will represent, X is the filter, and B is a matrix with rows based on another hash of the data elements that the filter will represent and the acceptable error rate for the filter. Further details regarding XORSAT filters are discussed in Weaver, *Satisfiability-based Set Membership Filters* (previously referenced herein).

To convert a particular type of online filter to either an offline filter or a different type of online filter, the system, in various embodiments, first determines the types/formats of each of the relevant filters. Then, in various embodiments, the system extracts the appropriate data representations from the original online filter. Generally, how (and in what format) the system extracts the appropriate data representation will depend on the format of both the original filter and the new filter. In various embodiments, the system converts the extracted data representations into the data representation format of the new filter. The system, in various embodiments, then constructs the new filter from the converted data representations.

Exemplary Embodiments

Referring now to the figures, for the purposes of example and explanation of the fundamental processes and components of the disclosed systems and methods, reference is made to FIG. 1, in which an exemplary filter conversion process 100 is shown according to one embodiment of the present disclosure. As will be understood and appreciated, the exemplary filter conversion process 100 shown in FIG. 1 represents merely one approach or embodiment of the present system, and other aspects are used according to various embodiments of the present system. As will be understood by one having ordinary skill in the art, the steps and processes shown in FIG. 1 (and those of all other flowcharts and sequence diagrams shown and described herein) may operate concurrently and continuously, are generally asynchronous and independent, and are not necessarily performed in the order shown.

Generally, exemplary filter conversion process 100 is the process by which the disclosed system converts one or more online filters to an offline filter or other type of online filter without access to any or all of the original data that the original online filter represents. As will occur to one having ordinary skill in the art, this conversion may be useful when a new filter type is needed due to changing requirements for functionality, security, or compatibility of the underlying set membership filter. For example, the exemplary filter conversion process 100 may convert a Cuckoo filter used to dynamically represent data within an enterprise data storage system to an XORSAT filter used to statically represent data in that enterprise's data archive. In various embodiments, the XORSAT filter will be more space efficient than the Cuckoo filter but will not permit insertion or deletion of data records, as well as being unable to count the number of data elements represented within it.

In one embodiment, the exemplary filter conversion process 100 may be the process by which the disclosed system converts/recodes an online filter into the same type of filter. Generally, recoding an original online filter results in a new online filter of the same type as the original online filter, representing the same underlying data as the original online filter, but using different hashes so that the new filter is no longer identical to the original online filter. As will occur to one having ordinary skill in the art, this recoding may be useful to optimize the false positive rate of the filter (the different hashes result in different false positive rates, avoiding false positives for common terms, etc.) or to confound a malicious third party that has already determined the underlying data in a portion of the original filter (in this embodiment, the recoding could also comprise inserting or removing padding/confounding noise that intentionally produces false positives and further obfuscates the identity of the underlying data). For example, the exemplary filter conversion process 100 may convert a Cuckoo filter of a given false positive rate into another Cuckoo filter with an optimized false positive rate.

In one embodiment, the exemplary filter conversion process 100 may be the process by which the disclosed system converts/merges two or more online filters into a single online or offline filter. For example, the exemplary filter conversion process may convert a Cuckoo filter and a counting quotient filter into a single XORSAT filter. Generally, to merge two or more online filters into a single online or offline filter, the system may extract data representations from each of the original online filters (e.g., as part of a single or multiple data representation extraction processes 200) and assemble all of the extracted data representations into the single online or offline filter (e.g., as part of the new filter construction process 300).

In various embodiments, the exemplary filter conversion process 100 begins at step 102, wherein the system determines the filter format of both the original filter(s) and the desired new filter. Generally, the filter formats determine how (and in what format) the data representations will be extracted from the original filter. The system may determine the filter formats by comparing the structure of the original filter to previously-stored structure definitions for various filters, accessing metadata associated with the filters, receiving user-defined determinations of the formats, etc.

After determining the filter formats, in various embodiments, the system proceeds to a data representation extraction process 200, wherein the data representations within the original filter are extracted so that the data representations may be used to construct the new filter. Further details of the data representation extraction process 200 will be discussed in association with the description of FIG. 2. Generally, a data representation comprises the data within the original filter that represents a particular data element within the set of data elements from which the original filter was constructed. Thus, as part of the data representation extraction process 200, the system extracts data from the original filter that, while not the original data elements from which the original filter was constructed, represent those original data elements and comprise the basis for the data from which the new filter will be constructed. How, exactly, the data representation is extracted from the original filter will generally depend on the format of the original filter (e.g., counting Bloom filters and approximate concurrent state machines could be constructed via d-left Hashing or Dynamic Bit Reassignment, the process for extracting a data representation from a Bloom filter is different than the process for extracting a data representation from a Cuckoo filter—for example, to convert a Bloom filter, a ListEntries( ) function may be run on the invertible Bloom lookup table to generate key-value pairs for the left-hand and right-hand matrices, etc.). In one embodiment, the system may also access a portion of the original data set from which the original filter was constructed to gather additional data (e.g., what information was removed from the original data set to construct the original filter, etc.).

In various embodiments, depending on the original and new filter formats, the system may optionally convert the extracted original data representations into a data format that will be accepted by the new filter at step 104. In one embodiment, converting the format of the data representations is part of a new filter construction process 300. Generally, the new filter construction process 300 is the process by which the system constructs the new filter from the extracted original data representations. How, exactly, the new filter is constructed from the extracted original data representations will generally depend on the format of the new filter (e.g., the process for constructing a Bloom filter is different than the process for constructing an XORSAT filter, etc.). Generally, in various embodiments, care should be taken to ensure that each distinct data representation from the original filter maps to a distinct data representation in the new filter (e.g., converting a Cuckoo filter into a Bloom filter using only the fingerprints may result in data loss that increases the false positive rate of the Bloom filter, thus, to lower the false positive rate, in one embodiment, $X=F(I,I(h(f(t))\|f(t)))$ may be used as in the input for the new Bloom filter, etc.).

Once the new filter has been constructed, in various embodiments, at step 106, the system stores the new filter in the appropriate location, and the exemplary filter conversion process 100 ends thereafter.

Now referring to FIG. 2, an exemplary data representation extraction process 200 is shown according to one embodiment of the present disclosure. Generally, the exemplary data representation extraction process 200 is the process by which data representations are extracted from the original filter. Although the exemplary data representation extraction process 200 may be used to extract data representations from any online filters, reference, for clarity's sake, is made herein only to Cuckoo filters. This disclosure does not place any limitations on the types of filters from which data representations may be extracted. For example, the exemplary data representation extraction process 200 may be used to extract data representations from Bloom filters, quotient filters, counting quotient filters, rank-and-select-based quotient filters, etc.

In various embodiments, the exemplary data representation extraction process 200 begins at step 202, wherein the system defines the extraction function. Generally, the extraction function is the function that will be used to extract the data representations from the original filter. In one embodiment, for Cuckoo filters, the extraction function is a symmetric function satisfying $F(x,y)=F(y,x)$ for all x,y. For example, $F(x,y)=SHA\text{-}256(x\|y) \oplus SHA\text{-}256(y\|x)$. In various embodiments, the extraction function is determined based on the format of the original filter.

At step 204, in various embodiments, the system extracts the data representation in the first occupied storage location of the original filter. In one embodiment, the system processes each data element within the filter with the extraction function (from step 202).

For example, a data representation in a Cuckoo filter is generally comprised of a fingerprint hash that has been stored in one of two locations/buckets. Thus, in one embodiment, the system determines the two possible locations, extracts the data elements stored in those locations, and processes each of those data elements using the symmetric function defined above to generate the fingerprint hash. In one embodiment, for each fingerprint $f(t_{ij})$ belonging to the bucket with key i, the system defines $L(f(t_{ij}),i)=F(I,I\,h(f(t_{ij})))$ and $R(f(t_{ij}),i)=f(t_{ij})$ using Gaussian elimination based on the data elements extracted from the buckets of the Cuckoo filter.

In various embodiments, at step 206, the system then extracts the data representation in the next occupied storage location of the original filter. Generally, the extraction in steps 204 and 206 are identical, except that the data representation extracted and the location from which it is extracted are different. At step 208, in various embodiments, the system determines whether all the data representations have been extracted from the original filter. If the system determines that not all of the data representations have been extracted from the original filter, then, in one embodiment, the system returns to step 206 to extract the data representation in the next occupied storage location of the original filter. If, however, the system determines that all of the data representations have been extracted from the original filter, then, in one embodiment, the exemplary data representation extraction process 200 ends thereafter.

Referring now to FIG. 3, an exemplary new filter construction process 300 is shown according to one embodiment of the present disclosure. Generally, the exemplary new filter construction process 300 is the process by which new filters are constructed from the data representations extracted from the original filter (e.g., extracted as part of the exemplary data representation extraction process 200 and optionally converted as part of step 104). Although the exemplary new filter construction process 300 may be used to construct any online or offline filters, reference, for clarity's sake, is made herein only to XORSAT filters. This disclosure does not place any limitations on the types of online or offline filters that may be constructed from the extracted data representations. For example, the exemplary new filter construction process 300 may be used to construct SAT filters, matrix solving-based filters, etc. In various embodiments, the extracted data representations are the inputs into any other type of filter (e.g., by formatting the extracted data representations into a format that is accepted by the other type of filter), so long as the extracted data representations have enough of the original data to ensure the fidelity of the data in the new filter. Thus, in various embodiments, the exemplary new filter construction process 300 represents one example of formatting the extracted data representations into a format that is accepted by the other filter type (e.g., XORSAT).

In various embodiments, for example in XORSAT filters, the exemplary new filter construction process 300 begins at step 302, wherein the system securely hashes each of the extracted data representations (e.g., using a secure hash function such as SHA-256). Generally, in various embodiments, the system places the securely-hashed versions of the extracted data representations into the rows of a left-hand binary matrix, for example L, at step 304. For example, the system generates a left-hand matrix (corresponding to the previously-discussed Cuckoo filter example) of:

$$\begin{pmatrix} L(f(t_{11}),1) \\ L(f(t_{12}),1) \\ \vdots \\ L(f(t_{1n}),1) \\ L(f(t_{21}),2) \\ \vdots \\ L(f(t_{mn}),m)) \end{pmatrix}$$

The system, in various embodiments, at step 306, hashes each of the extracted data representations based on the required error rate (e.g., number of false positives, etc.) of the new filter. Generally, in various embodiments, the system places the hashed versions of the extracted data representations into the rows of a right-hand binary matrix, for example R, at step 308. For example, continuing the example involving XORSAT filters, the system generates a right-hand matrix:

$$\begin{pmatrix} R(f(t_{11}), 1) \\ R(f(t_{12}), 1) \\ \vdots \\ R(f(t_{1n}), 1) \\ R(f(t_{21}), 2) \\ \vdots \\ R(f(t_{mn}), m)) \end{pmatrix}$$

In various embodiments, at step 310, the system constructs the new filter from the right-hand and left-hand matrices, for example by solving the linear equation LX=R, wherein X represents the filter. For example, continuing the example involving XORSAT filters, the system generates the filter:

$$\begin{pmatrix} x_1 \\ x_2 \\ \vdots \\ x_n \\ x_{n+1} \\ \vdots \\ x_{nm} \end{pmatrix}$$

such that $$\begin{pmatrix} L(f(t_{11}), 1) \\ L(f(t_{12}), 1) \\ \vdots \\ L(f(t_{1n}), 1) \\ L(f(t_{21}), 2) \\ \vdots \\ L(f(t_{mn}), m)) \end{pmatrix} \begin{pmatrix} x_1 \\ x_2 \\ \vdots \\ x_n \\ x_{n+1} \\ \vdots \\ x_{nm} \end{pmatrix} = \begin{pmatrix} R(f(t_{11}), 1) \\ R(f(t_{12}), 1) \\ \vdots \\ R(f(t_{1n}), 1) \\ R(f(t_{21}), 2) \\ \vdots \\ R(f(t_{mn}), m)) \end{pmatrix}$$

After construction of the new filter, the exemplary new filter construction process 300 ends thereafter.

Now referring to FIG. 4, an exemplary architecture 400 of one embodiment of the disclosed system is shown. The exemplary architecture 400 in FIG. 4 is shown for illustrative purposes only and could comprise only one engine, module, or collection of code, etc. In various embodiments, a filter conversion system 101 comprises a data representation extraction engine 201 and a new filter construction engine 301 and is operatively connected to a system database 401 and an electronic computing device 403 via network 405 to conduct the processes disclosed herein. Generally, network 405 may be any connection capable of transferring data between two or more computer systems (e.g., a secure or unsecured connection, Bluetooth, wireless or wired local-area networks (LANs), cell network, the Internet, etc.). Accordingly, the disclosed systems and methods permit conversion of filters without full access to the original data represented by the filter, which promotes security (e.g., if the original data is sensitive and access to the same is controlled) and avoids processing difficulties associated with accessing and generating filters from large amounts of original data (e.g., insufficient memory to hold all of the original data, decreased processing speeds, etc.).

Generally, the electronic computing device 403 is any device that is capable of performing the functionality disclosed herein (e.g., desktop computer, laptop computer, tablet computer, smartphone, file management system, encrypted data storage system, enterprise data security system, encryption system, search management system, etc.). In various embodiments, the electronic computing device 403 communicates via network 405 with the filter conversion system 101 to provide filters for conversion and provide certain administrative functionality with respect to the filter conversion system 102 (e.g., defining preferences, calibrating, etc.).

In various embodiments, the filter conversion system 101 (and its engines) may be any computing device (e.g., desktop computer, laptop, servers, tablets, etc.), combination of computing devices, software, hardware, or combination of software and hardware that is capable of performing the functionality disclosed herein. Generally, the filter conversion system 101 communicates via network 405 with the system database 401 and/or electronic computing device 403 to conduct the filter conversion process 100. In various embodiments, the filter conversion system 101 may comprise the data representation extraction engine 201 and new filter construction engine 301. In one embodiment, the data representation extraction engine 201 conducts the data representation extraction process 200. The new filter construction engine 301, in one embodiment, conducts the new filter construction process 300.

The system database 401, in various embodiments, may be any computing device (e.g., desktop computer, laptop, servers, tablets, etc.), combination of computing devices, software, hardware, combination of software and hardware, database (e.g., stored in the cloud or on premise, structured as relational, etc.), or combination of databases that is capable of performing the functionality disclosed herein. In one embodiment, the system database 401 is local to the filter conversion system 101 (e.g., the filter conversion system 101 comprises the system database 401). In other embodiments, the system 401 is virtual or stored in the "cloud." In one embodiment, the system database 401 communicates via network 405 with the filter conversion system 101 and/or electronic computing device 403 to facilitate the filter conversion process 100.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A method for converting an original online filter to a new online or offline filter, comprising the steps of:
   determining a type of the original online filter, wherein the original online filter comprises first filter data corresponding to original data;
   determining the type of the new online or offline filter;
   extracting representations of the original data from the original online filter based on the determined type of the original online filter;
   converting the representations of the original data into second filter data comprising a left-hand matrix and a right-hand matrix by:
      hashing the representations of the original data with a first secure hash function to generate secure filter data;
      constructing the left-hand matrix based on the secure filter data;
      hashing the representations of the original data with a first secure hash function to generate error-rate limited filter data; and
      constructing the right-hand matrix based on the error-rate limited filter data,
   wherein the second filter data is in a format compatible with the determined type of the new online or offline filter; and
   constructing the new online or offline filter based on the left-hand matrix and the right-hand matrix.

2. The method of claim 1, wherein the type of the original online filter is selected from a group consisting of: Bloom filters, compressed Bloom filters, blocked Bloom filters, counting Bloom filters, spectral Bloom filters, buffered quotient filters, cascade filters, Cuckoo filters, approximate concurrent state machines, rank-index hashing, key-value Bloom filters, stable Bloom filters, and counting quotient filters.

3. The method of claim 1, wherein the type of the new online or offline filter is selected from a group consisting of: Bloom filters, compressed Bloom filters, blocked Bloom filters, counting Bloom filters, spectral Bloom filters, buffered quotient filters, cascade filters, Cuckoo filters, approximate concurrent state machines, rank-index hashing, key-value Bloom filters, stable Bloom filters, and counting quotient filters.

4. The method of claim 1, wherein the type of the new online or offline filter is selected from a group consisting of: matrix-solving based dictionaries, succinct dictionaries, word-size truncated recursion filters, SAT filters, XORSAT filters, and Bloomier filters.

5. The method of claim 1, wherein the step of extracting representations of the original data from the original online filter further comprises the steps of:
   defining an extraction function;
   determining a first occupied storage location in the original online filter;
   extracting a first representation of the original data from the first occupied storage location based on the extraction function;
   determining a next occupied storage location in the original online filter; and
   extracting a next representation of the original data from the next occupied storage location based on the extraction function.

6. The method of claim 5, wherein the step of extracting representations of the original data from the original online filter further comprises the step of comparing the representations of the original data to a portion of the original data.

7. The method of claim 5, wherein the step of extracting representations of the original data from the original online filter occurs without access to the original data.

8. The method of claim 5, wherein the extraction function comprises a symmetric function satisfying $F(x,y)=F(y,x)$ for all x,y.

9. The method of claim 1, wherein the step of extracting representations of the original data from the original online filter further comprises the step of determining that there is no next occupied storage location in the original online filter.

10. The method of claim 1, wherein the determined type of the original online filter is a Cuckoo filter.

11. The method of claim 10, wherein the determined type of the new online or offline filter a is an XORSAT filter.

12. The method of claim 1, wherein the left-hand matrix comprises:

$$\begin{pmatrix} L(f(t_{11}), 1) \\ L(f(t_{12}), 1) \\ \vdots \\ L(f(t_{1n}), 1) \\ L(f(t_{21}), 2) \\ \vdots \\ L(f(t_{mn}, m)) \end{pmatrix}.$$

13. The method of claim 1, wherein the right-hand matrix comprises:

$$\begin{pmatrix} R(f(t_{11}), 1) \\ R(f(t_{12}), 1) \\ \vdots \\ R(f(t_{1n}), 1) \\ R(f(t_{21}), 2) \\ \vdots \\ R(f(t_{mn}, m)) \end{pmatrix}.$$

14. The method of claim 1, wherein the new online or offline filter comprises:

$$\begin{pmatrix} x_1 \\ x_2 \\ \vdots \\ x_n \\ x_{n+1} \\ \vdots \\ x_{nm} \end{pmatrix}$$

such that $$\begin{pmatrix} L(f(t_{11}),1) \\ L(f(t_{12}),1) \\ \vdots \\ L(f(t_{1n}),1) \\ L(f(t_{21}),2) \\ \vdots \\ L(f(t_{mn}),m)) \end{pmatrix} \begin{pmatrix} x_1 \\ x_2 \\ \vdots \\ x_n \\ x_{n+1} \\ \vdots \\ x_{nm} \end{pmatrix} = \begin{pmatrix} R(f(t_{11}),1) \\ R(f(t_{12}),1) \\ \vdots \\ R(f(t_{1n}),1) \\ R(f(t_{21}),2) \\ \vdots \\ R(f(t_{mn}),m)) \end{pmatrix}.$$

15. The method of claim 1, wherein the original online filter comprises a first original online filter, further comprising the steps of:

prior to determining the type of the new online or offline filter, determining the type of a second original online filter, wherein the second original online filter comprises third filter data corresponding to additional original data; and prior to converting the representations of the original data into second filter data corresponding to the original data, extracting representations of the additional original data from the second original online filter based on the determined type of the second original online filter, wherein the step of converting the representations of the original data into second filter data corresponding to the original data, further comprises converting the representations of the additional original data into the second filter data.

16. A system for converting an original online filter to a new online or offline filter, comprising a processor operative to:

determine a type of the original online filter, wherein the original online filter comprises first filter data corresponding to original data;

determine the type of the new online or offline filter;

extract representations of the original data from the original online filter based on the determined type of the original online filter;

convert the representations of the original data into second filter data comprising a left-hand matrix and a right-hand matrix by:

hashing the representations of the original data with a first secure hash function to generate secure filter data;

constructing the left-hand matrix based on the secure filter data;

hashing the representations of the original data with a first secure hash function to generate error-rate limited filter data; and constructing the right-hand matrix based on the error-rate limited filter data, wherein the second filter data is in a format compatible with the determined type of the new online or offline filter; and construct the new online or offline filter based on the left-hand matrix and the right-hand matrix.

17. The system of claim 16, wherein the type of the original online filter is selected from a group consisting of: Bloom filters, compressed Bloom filters, blocked Bloom filters, counting Bloom filters, spectral Bloom filters, buffered quotient filters, cascade filters, Cuckoo filters, approximate concurrent state machines, rank-index hashing, key-value Bloom filters, stable Bloom filters, and counting quotient filters.

18. The system of claim 16, wherein the type of the new online or offline filter is selected from a group consisting of: Bloom filters, compressed Bloom filters, blocked Bloom filters, counting Bloom filters, spectral Bloom filters, buffered quotient filters, cascade filters, Cuckoo filters, approximate concurrent state machines, rank-index hashing, key-value Bloom filters, stable Bloom filters, and counting quotient filters.

19. The system of claim 16, wherein the type of the new online or offline filter is selected from a group consisting of: matrix-solving based dictionaries, succinct dictionaries, word-size truncated recursion filters, SAT filters, XORSAT filters, and Bloomier filters.

20. The system of claim 16, wherein the processor, to extract representations of the original data from the original online filter, is further operative to:

define an extraction function;

determine a first occupied storage location in the original online filter;

extract a first representation of the original data from the first occupied storage location based on the extraction function;

determine a next occupied storage location in the original online filter; and extract a next representation of the original data from the next occupied storage location based on the extraction function.

21. The system of claim 20, wherein the processor, to extract representations of the original data from the original online filter, is further operative to determine that there is no next occupied storage location in the original online filter.

22. The system of claim 20, wherein the processor, to extract representations of the original data from the original online filter, is further operative to compare the representations of the original data to a portion of the original data.

23. The system of claim 20, wherein the processor, to extract representations of the original data from the original online filter, does not have access to the original data.

24. The system of claim 16, wherein the determined type of the original online filter is a Cuckoo filter.

25. The system of claim 16, wherein the determined type of the new online or offline filter is an XORSAT filter.

26. The system of claim 16, wherein the left-hand matrix comprises:

$$\begin{pmatrix} L(f(t_{11}),1) \\ L(f(t_{12}),1) \\ \vdots \\ L(f(t_{1n}),1) \\ L(f(t_{21}),2) \\ \vdots \\ L(f(t_{mn}),m)) \end{pmatrix}.$$

27. The system of claim 16, wherein the right-hand matrix comprises:

$$\begin{pmatrix} R(f(t_{11}),1) \\ R(f(t_{12}),1) \\ \vdots \\ R(f(t_{1n}),1) \\ R(f(t_{21}),2) \\ \vdots \\ R(f(t_{mn}),m)) \end{pmatrix}.$$

28. The system of claim 16, wherein the new online or offline filter comprises:

$$\begin{pmatrix} x_1 \\ x_2 \\ \vdots \\ x_n \\ x_{n+1} \\ \vdots \\ x_{nm} \end{pmatrix}$$

such that $$\begin{pmatrix} L(f(t_{11}), 1) \\ L(f(t_{12}), 1) \\ \vdots \\ L(f(t_{1n}), 1) \\ L(f(t_{21}), 2) \\ \vdots \\ L(f(t_{mn}, m)) \end{pmatrix} \begin{pmatrix} x_1 \\ x_2 \\ \vdots \\ x_n \\ x_{n+1} \\ \vdots \\ x_{nm} \end{pmatrix} = \begin{pmatrix} R(f(t_{11}), 1) \\ R(f(t_{12}), 1) \\ \vdots \\ R(f(t_{1n}), 1) \\ R(f(t_{21}), 2) \\ \vdots \\ R(f(t_{mn}, m)) \end{pmatrix}.$$

29. The system of claim 16, wherein the original online filter comprises a first original online filter and wherein the processor is further operative to:

prior to determining the type of the new online or offline filter, determine the type of a second original online filter, wherein the second original online filter comprises third filter data corresponding to additional original data; and prior to converting the representations of the original data into second filter data corresponding to the original data, extract representations of the additional original data from the second original online filter based on the determined type of the second original online filter, wherein the processor, to convert the representations of the original data into second filter data corresponding to the original data, is further operative to convert the representations of the additional original data into the second filter data.

30. The system of claim 16, wherein the original online filter comprises an invertible Bloom lookup table and the processor, to extract representations of the original data from the original online filter, is operative to run a list entries function operative to generate key-value pairs for the left-hand matrix and the right-hand matrix.

31. A non-transitory computer-readable medium embodying a program for converting an original online filter to a new online or offline filter, the program configured, when executed by a processor, to cause the processor to:

determine that a type of the original online filter is a Cuckoo filter, wherein the original online filter comprises first filter data corresponding to original data;

determine that a type of the new online or offline filter is an XORSAT filter;

extract representations of the original data from the original online filter based on the determined type of the original online filter;

convert the representations of the original data into second filter data corresponding to the original data, wherein the second filter data is in a format compatible with the determined type of the new online or offline filter; and construct the new online or offline filter based on the second filter data.

32. The non-transitory computer-readable medium of claim 31, wherein the program, to convert the representations of the original data into second filter data corresponding to the original data, further causes the processor to:

hash the representations of the original data with a first secure hash function to generate secure filter data;

construct a left-hand matrix based on the secure filter data;

hash the representations of the original data with a first secure hash function to generate error-rate limited filter data; and construct a right-hand matrix based on the error-rate limited filter data.

33. The non-transitory computer-readable medium of claim 32, wherein the program, to construct the new online or offline filter, further causes the processor to generate the new online or offline filter based on the left-hand matrix and the right-hand matrix.

34. The non-transitory computer-readable medium of claim 31, wherein the program, to extract representations of the original data from the original online filter, does not have access to the original data.

* * * * *